United States Patent
Kanitkar

(10) Patent No.: US 11,683,859 B2
(45) Date of Patent: Jun. 20, 2023

(54) CONNECTING TO A FIXED NETWORK USING AN EXTENSIBLE DRONE-BASED, DYNAMIC NETWORK

(71) Applicant: Akamai Technologies, Inc., Cambridge, MA (US)

(72) Inventor: Vinay Kanitkar, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 232 days.

(21) Appl. No.: 17/077,650

(22) Filed: Oct. 22, 2020

(65) Prior Publication Data

US 2021/0282224 A1 Sep. 9, 2021

Related U.S. Application Data

(60) Provisional application No. 62/984,561, filed on Mar. 3, 2020.

(51) Int. Cl.
| | |
|---|---|
| *H04W 84/00* | (2009.01) |
| *H04W 84/18* | (2009.01) |
| *H04W 40/12* | (2009.01) |
| *H04W 16/18* | (2009.01) |
| *B64C 39/02* | (2023.01) |

(Continued)

(52) U.S. Cl.
CPC .......... *H04W 84/18* (2013.01); *B64C 39/024* (2013.01); *H04L 43/0888* (2013.01); *H04W 16/18* (2013.01); *H04W 40/12* (2013.01); *B64U 2101/20* (2023.01)

(58) Field of Classification Search
CPC ..... H04W 84/18; H04W 16/18; H04W 40/12; B64C 39/024; H04L 43/0888; B64U 2101/20
See application file for complete search history.

(56) References Cited

U.S. PATENT DOCUMENTS

| | | | |
|---|---|---|---|
| 8,332,484 B2 | 12/2012 | Afergan et al. | |
| 9,363,651 B1* | 6/2016 | daCosta | ................. H04W 4/14 |
| 10,447,483 B1* | 10/2019 | Su | ......................... H04L 9/0643 |

(Continued)

FOREIGN PATENT DOCUMENTS

WO  WO-2019240989 A1 * 12/2019  ........... G05D 1/0289

*Primary Examiner* — Khai M Nguyen
(74) *Attorney, Agent, or Firm* — David H. Judson

(57) ABSTRACT

A method for dynamic and extensible creation of an extensible wireless network, using a set of drones that individually support server processes. The drones interact with one another, exchanging information, type of coverage, type and amount of throughput, location, etc. A control node connects to a wired network. The node operates a leader election protocol, captures state information from the drones, and positions/re-positions the drones as necessary. Drones are flown in to position and then engaged as necessary to stretch/adapt the coverage as necessary. The drone's power utilization is monitored and its coverage area modified as necessary to optimize power utilization. The control node performs drone-based coverage/power utilization computations, and attempts to apply the appropriate location assignments to provide maximum network coverage (extensibility) while also preserving drone-specific power (battery) utilization. The approach herein can be used to supplement existing networks during events, migrations of populations during work hours, etc.

19 Claims, 2 Drawing Sheets

(51) Int. Cl.
*H04L 43/0888* (2022.01)
*B64U 101/20* (2023.01)

(56) References Cited

U.S. PATENT DOCUMENTS

| | | |
|---|---|---|
| 2005/0124329 A1 | 6/2005 | Yadav |
| 2006/0291482 A1 | 12/2006 | Evans |
| 2011/0320256 A1* | 12/2011 | Fiorucci .................. H04W 4/42 |
| | | 705/14.27 |
| 2016/0134691 A1 | 5/2016 | Law |
| 2017/0045884 A1 | 2/2017 | Kablaoui |
| 2017/0243494 A1* | 8/2017 | Taveira .................. G08G 5/006 |
| 2018/0007518 A1 | 1/2018 | O'Berry et al. |
| 2018/0184269 A1 | 6/2018 | Christoval et al. |
| 2018/0247546 A1* | 8/2018 | Wouhaybi ............. B64C 39/024 |
| 2018/0310187 A1 | 10/2018 | Ross |
| 2018/0348748 A1 | 12/2018 | Dowlatkhah et al. |
| 2019/0108472 A1 | 4/2019 | Sweeney et al. |
| 2019/0182318 A1 | 6/2019 | Haebler et al. |
| 2019/0245927 A1 | 8/2019 | Auerbach |
| 2019/0335375 A1 | 10/2019 | Yeddala et al. |
| 2020/0007226 A1 | 1/2020 | Takagi et al. |
| 2020/0106818 A1* | 4/2020 | Luong .................. B64C 39/024 |
| 2022/0383728 A1* | 12/2022 | Brown .................. G08B 25/10 |

* cited by examiner

CONNECTING TO A FIXED NETWORK USING AN EXTENSIBLE DRONE-BASED, DYNAMIC NETWORK

BACKGROUND

Technical Field

This application relates generally to data delivery over networks.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

It is known to extend a CDN to interoperate with a peer-to-peer (P2P) network. One such hybrid solution is described in U.S. Pat. No. 8,332,484. In this approach, the content delivery network includes a mapping system for directing requests to CDN servers. One or more peer machines become associated with the CDN, and the CDN mapping system is then used to enable a given peer to locate another peer in the P2P network, and/or a CDN server. Using this hybrid approach, CDN customer content may be delivered from the CDN edge network, from the P2P network, or from both networks. In one embodiment, customer content is uploaded to the CDN and stored in the edge network, or in a storage network associated therewith. The CDN edge network is then used to prime the P2P network, which may be used to take over some of the content delivery requirements for the customer content. The decision of whether to use edge network or peer network resources for delivery may be based on load and traffic conditions.

A mesh network a local network topology in which the infrastructure nodes (i.e. bridges, switches, and other infrastructure devices) connect directly, dynamically and non-hierarchically to as many other nodes as possible and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event a few nodes should fail. This in turn contributes to fault-tolerance and reduced maintenance costs.

Demand for network connectivity is not always generated from static (fixed) sources. In certain installations, e.g., concerts, stadiums, military, first responder scenarios, the "scope" of the network is ill-defined or not capable of being defined in advance. Thus, it is not possible for a service provider—including, without limitation, an overlay network provider—to position network infrastructure (to service user requirements) in advance. That said, it is known in the prior art to provide wireless ad hoc networks using drones, but these approaches have not been extended, e.g., to create an extensible network for the wired Internet itself.

BRIEF SUMMARY

The subject matter herein provides for a method and system for dynamic and extensible creation of an extensible wireless network, preferably via a set of drones, which individually support/host server processes. The drones interact with a control node/host (or one another), exchanging information such as type of coverage, type and amount of throughput, location, etc. A control node, typically attached at a 5G hotspot, connects to the wired (terrestrial) network, e.g., the publicly-routable Internet. The control node operates a leader election protocol, captures state information from the drones, and positions/re-positions the drones as necessary (or on-the-fly) to create an extensible wireless network. Drones are flown in to position, e.g., landed on rooftops, and then engaged as necessary to stretch/adapt the coverage as necessary. The drone's power utilization is monitored and its coverage area modified as necessary to optimize power utilization. The control node thus performs drone-based coverage/power utilization computations, and attempts to apply the appropriate location assignments to provide maximum network coverage (extensibility) while also preserving drone-specific power (battery) utilization and maintaining a quality of service (QoS).

The drones are used to create a network on-demand along with an appropriate set of content. This approach can be used to supplement existing networks during events, migrations of populations during work hours, etc. In lieu of drones, satellites may be used in whole or in part to provide the networking infrastructure for the extensible network.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION

Figure 1:
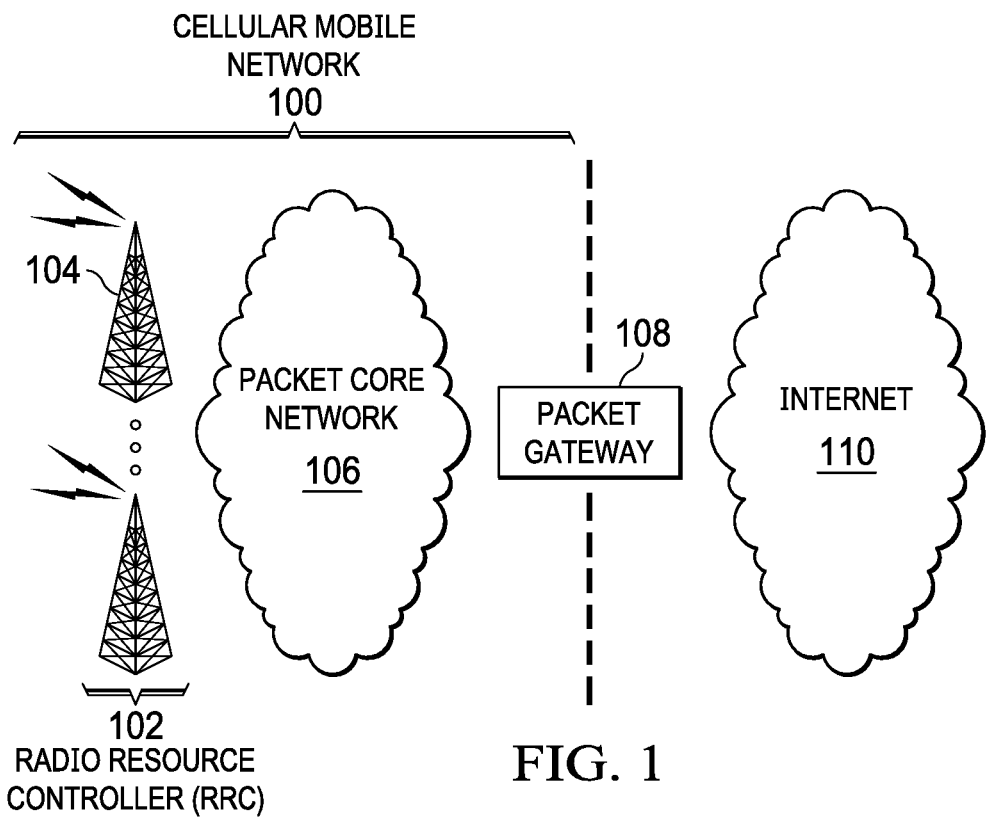
FIG. 1 depicts a cellular mobile network model.

By way of background, FIG. 1 shows a simplified architectural model of a cellular mobile network 100 (e.g., a 4G network). In the drawing, a radio resource controller (RRC) 102 resides in a base station (radio tower) 104. RRC 102 is the entity that manages allocation of the radio link between an end user and the base station. The RRC manages the radio link such that the link between the radio tower and end user is allocated only when needed. Also depicted is the packet core network 106, which serves the traffic between the RRC and a packet gateway 108. The communication protocols in the packet core network are proprietary in the sense that they are operated in a black box-style, i.e., not exposed to the other network protocol-speaking equipment outside the packet core network. The packet gateway 108 is the interface for the rest of the Internet 110. It is the intermediary between the packet core network and the Internet. 5G is the fifth generation wireless technology for digital cellular networks that began wide deployment in 2019. "5G" can also be referred to as New Radio (NR) access. As with previous standards, the covered areas are divided into regions called "cells," serviced by individual antennas. The frequency spectrum of 5G is divided into millimeter waves, mid-band and low-band. Low-band uses a similar frequency range as the predecessor, 4G.

As used herein, a drone" refers to an unmanned vehicle that is piloted by remote control or onboard computers. Drones typically are aerial, but they may also include unmanned land-based vehicles, unmanned water-based (floating) vehicles, or even unmanned spacecraft. Drones may be operated under remote control by a human operator, or fully or intermittently autonomously by onboard one or more onboard computers. More generally, a "drone" is any movable component that supports a computing capability and network communications capability.

Figure 2:
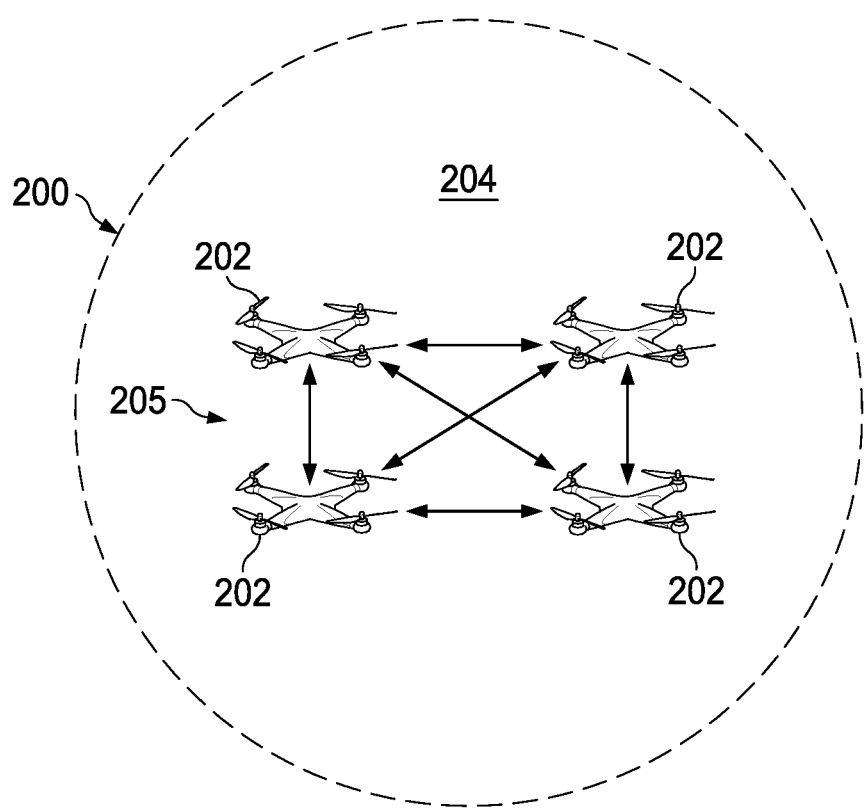
FIG. 2 depicts a network of drones connected in a mesh network to provide 5G and/or Wi-Fi coverage in a coverage area.

FIG. 2 depicts a network 200 of drones 202 connected in a mesh network 205 to provide 5G and/or Wi-Fi coverage in an area 204. The coverage area 2-4 may have any desired shape, and is typically shaped based on the actual deployment of the drones as well as environmental conditions. The coverage area may be contiguous, or it may be a collection of disconnected coverage areas and may have holes or gaps in the coverage area within the perimeter of the coverage area. The network 200 is a fully-interconnected mesh network, although at any particular time and/or location within the network there may be any level of interconnectivity among the drones. There may be multiple independent drone networks (each comprising one or more drones), with one drone network overlaying or otherwise coupled to another drone network. Typically, drones are battery powered, and thus power management is an important consideration.

Figure 3:
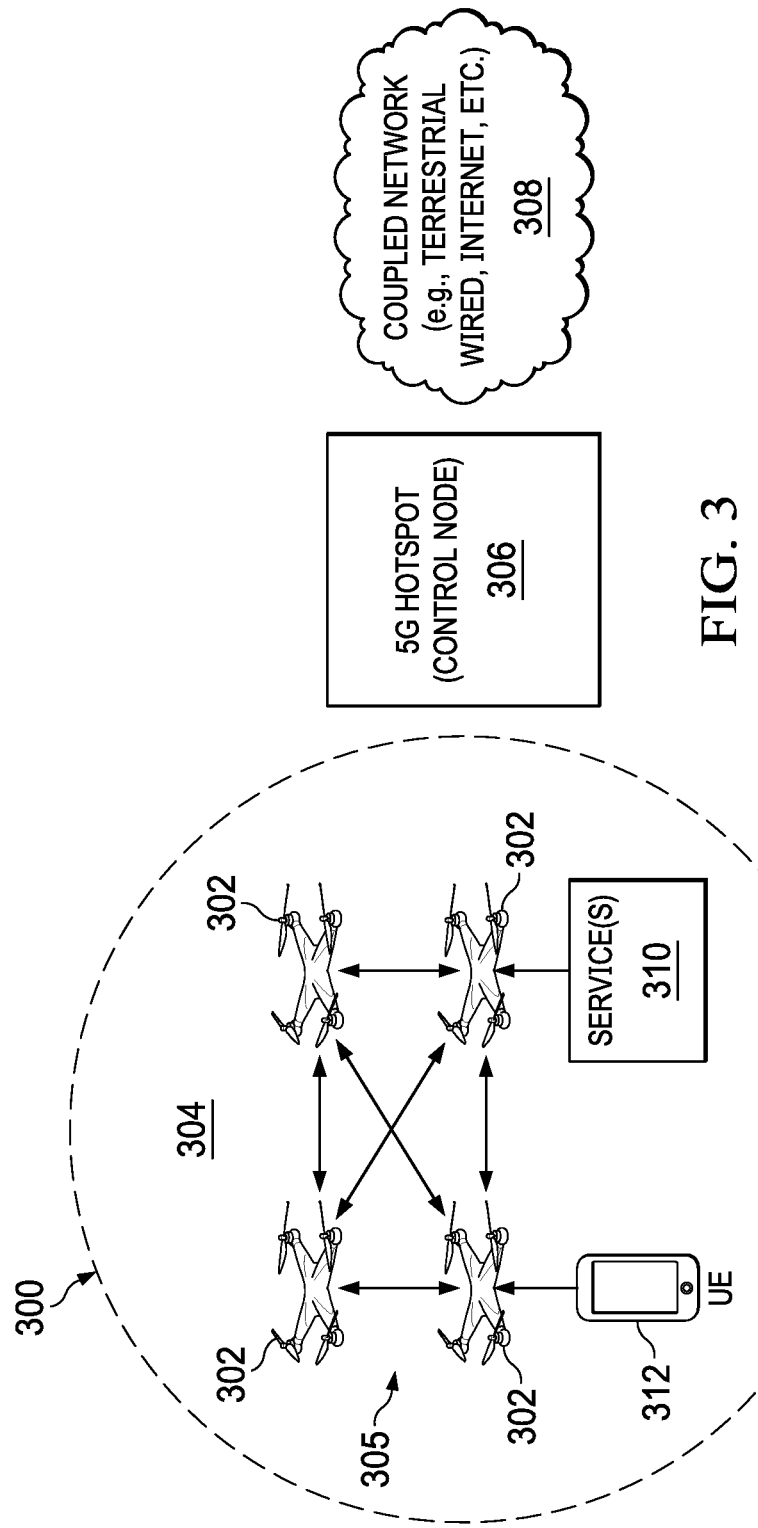
FIG. 3 depicts using an extensible drone-based, dynamic network coupled to a public wired (terrestrial network) according to this disclosure.

As depicted in FIG. 3, and according to this disclosure, a control node 306 has connectivity to an existing network, such as terrestrial network 308. Preferably, the control node operates as a 5G node hotspot. One or more drone nodes 302 have connectivity to the control node 306, although the number and location of the drone nodes 304 may vary over time and space 304. Collectively, the drone nodes 302 maintain connectivity to the control node 306 and thus form an ad hoc mesh network 305. The network 305 is an extensible drone-based, dynamic network (in the sense that the constituent drones may come and go, over time, or as drone(s) lost connectivity), and this drone network is coupled via the control node 306 to the network 308, which is typically a wired (terrestrial) network. Network 308 may be packet-based, such as the public-routable Internet. In the alternative, the network 308 may be a radio access network (RAN). A drone individually supports/hosts one or more server processes 310, e.g., an edge server associated with a content delivery network. More generally, the drone server process provides one or more services with respect to one or more requesting clients that are coupled to a server process. The drones interact with one another, exchanging information, type of coverage, type and amount of throughput, quality of service (QoS), location, etc. The control node 306, typically attached at a 5G hotspot, connects to the wired (terrestrial) network 308. The control node operates a leader election protocol, captures state information from the drones that are then present in the ad hoc network (and capable of maintaining connectivity to the control node), and selectively positions/re-positions the drones 302 as necessary (or on-the-fly) to create and/or maintain the extensible wireless network. Drones are flown in to position and then engaged as necessary to stretch/adapt the coverage as necessary. The drone's power utilization is monitored and its coverage area modified as necessary to optimize power utilization. The control node thus performs drone-based coverage/power utilization computations, and attempts to apply the appropriate location assignments to provide maximum network coverage (extensibility) while also preserving drone-specific power (battery) utilization and maintaining a quality of service (QoS).

The particular placement and organization of the drones by the control node is carried out according to one or more positioning algorithms. In one duplex-based arrangement, clients (UEs), such as mobile device 312, are making requests for service that are being received and managed by the drone server processes, and meanwhile the control node is managing the drones themselves. Content requests received at a drone server process may be forwarded through the control node to the coupled network, and responses received from the coupled network then returned to the requesting clients via the drone network. Thus, typically, the drone network operates in a full duplex mode. (RAN-based networks are not full duplex).

The control node is continuously receiving state and status information from one or more drones that maintain connectivity to the control node. Although the control node is shown as connected between the ad hoc drone network and the wired network, theoretically the control node may be any node that has the capability of maintaining connectivity to one or more of the drones of a drone network or subnetwork. In the usual case, the control node is a 5G hotspot that is coupled directly to the wired network. As noted, the control node receives sensor data from each of the drones. Thus, at any point-in-time, the control node knows the physical coverage area that is available to be surfaced, as well as the quality-of-service for that area. The control node operates to continuous position and/or re-position the then-connected drones, preferably to optimize QoS for the connected devices, while preserving battery life of the drones. Generalizing, the control node operates to provide optimal network coverage (extensibility) while also preserving drone-specific power (battery) utilization and maintaining quality of service (QoS) for one or more connected clients.

Representative algorithms that may be used for this purpose include, without limitation, maximum flow algorithms such as Ford-Fulkerson (FFK). FFK is a greedy algorithm that computes the maximum flow in a flow network. In operation, the control node continuously models the clients and drones as a flow network and positions/re-positions the drones as necessary to provide the maximum flow that maximizes battery life, provides the appropriate extensibility of the network, at the desired quality-of-service.

As used herein, a client may be any user equipment (UE). Generalizing, a mobile device (or UE) can refer to any type of wireless device that can communicate with a radio network node in a cellular or mobile communication system. Examples of mobile devices can include, but are not limited to, a target device, a device to device (D2D) UE, a machine type UE or a UE capable of machine to machine (M2M) communication, a Personal Digital Assistant (PDA), a tablet or pad (e.g., an electronic tablet or pad), a mobile terminal, a cellular and/or smart phone, a computer (e.g., a laptop embedded equipment (LEE), a laptop mounted equipment (LME), or other type of computer), a dongle (e.g., a Universal Serial Bus (USB) dongle), an electronic gaming device, a device associated or integrated with a vehicle (e.g., automobile, train, motorcycle, bicycle, ship, plane, . . . ), a motorized device (e.g., drone), or other entity, and so on.

The terms "network node device," "network node," and "network device" can be interchangeable with (or include) a network, a network controller or any number of other network components. Further, as utilized herein, the non-limiting term radio network node, or network node (e.g., network device, network node device) can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices also can comprise multiple antennas for performing various transmission operations (e.g., MIMO operations). A network node can comprise a cabinet and other protected enclosures, an antenna mast, and actual antennas. Network devices can serve several cells, and associated sectors (e.g., a sector can comprise one or more cells), depending on the configuration and type of antenna. Network node devices can be, for example, Node B devices, base station (BS) devices, access point (AP) devices, TRPs, and radio access network (RAN) devices. Other examples of network node devices can include multi-standard radio (MSR) node devices, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution. An edge compute instance may be supported in a virtual environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system (running TCP) or the like.

The functionality may be implemented with other application layer protocols besides HTTPS, such as SSL VPN, or any other protocol having similar operating characteristics.

The techniques herein may be used irrespective of the traffic type.

There is no limitation on the type of computing entity that may implement the client-side or server-side of the connection. Any computing entity (system, machine, device, program, process, utility, or the like) may act as the client or the server.

Finally, while given components of the system have been described separately, one of ordinary skill will appreciate that some of the functions may be combined or shared in given instructions, program sequences, code portions, and the like.

The techniques herein provide for improvements to a technology or technical field, namely, overlay networking, as well as improvements to the functioning of edge server itself, namely, by extending its conventional functionality as has been described.

Local data collection techniques (for supporting local model building) include, without limitation, active and passive data collection, data traffic monitoring, packet inspection, application layer-based, operating system kernel-based, and otherwise.

The various aspects described herein can relate to 5G (New Radio), which can be deployed as a standalone radio access technology or as a non-standalone radio access technology assisted by another radio access technology, such as Long Term Evolution (LTE). It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2

(3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Such wireless communication technologies also can include Bluetooth or near field communication (NFC) technologies. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/ HSPA, Global System for Mobile Communications (GSM)/ GSM EDGE Radio Access Network (GERAN), Wi Fi, Wireless Local Area Network (WLAN), WiMax, CDMA2000, and so on).

As used herein, a drone includes computing and communications hardware and software.

As used herein, the control node is a computing platform or entity that includes computing and communications hardware and software.

As used herein, a UE (e.g., a mobile device) is a computing entity that includes computing and communications hardware and software.

One or more drone networks may connect with one another and then to the control node.

A drone may support/host an application instance.

Preferably, one or more drones are parked when possible to preserve battery power.

As needed, a drone-based mesh network as described herein is reconfigured as necessary by rotating one or more drones in and out of service, e.g., as particular drones need to be recharged or otherwise fail, or for other operational, management, administrative or security reasons.

The drone-based mesh network as described herein also may be created dynamically, e.g., to bridge connectivity gaps, to help repair failures, etc., with respect to some other network.

Different drones within the drone-based mesh network may have different available power and thus may be assigned different tasks, e.g., based on their available processing or other capabilities. Thus, for example, a drone at a given network location (with significant power available) may be tasked to perform more computational or storage-intensive tasks (e.g., video processing/compression) as compared to one or more other drones located elsewhere. This type of configuration enables bandwidth available to the other drones to be used for other purposes. More generally, different compute functions are positioned at different places in the mesh based on power available, processing capability, or similar considerations. As a further variant, indirect routing may be used selectively across the mesh to enhance performance.

There is no requirement that the control node perform all of the planning for the entire mesh network; in an alternative embodiment, the control node is responsible for just a portion thereof. In a variant embodiment, a particular drone is configured to perform the above-described control operations and executes the positioning algorithm for its portion of the network. More generally, multiple drones (or control devices associated therewith) plan and enforce their respective portions of the network independently from one another.

Having described the subject matter herein, what is claimed is set forth as follows.

The invention claimed is:

1. A method of networking, comprising:
receiving information from each of one or more drones, the information comprising a type of coverage, a type and amount of throughput, a location, and battery data, wherein a drone provides a service; and
responsive to the information and one or more service requests, executing a positioning algorithm that positions the one or more drones into an extensible mesh network by attempting to balance an optimal coverage area associated with the one or more drones, an optimal power utilization for each of the drones, and a desired quality-of-service associated with the one or more service requests;
wherein the positioning algorithm is a maximum flow algorithm.

2. The method as described in claim 1 further including coupling the extensible mesh network to a wired network.

3. The method as described in claim 2 wherein the wired network is an Internet Protocol (IP)-based network.

4. The method as described in claim 2 wherein the positioning algorithm is executed in a control node that couples the extensible mesh network to the wired network.

5. The method as described in claim 1 wherein the maximum flow algorithm is a Ford-Fulkerson algorithm.

6. The method as described in claim 1 wherein the service is content delivery or application acceleration.

7. The method as described in claim 1 wherein the extensible mesh network is created on-the-fly in response to a given occurrence.

8. A method of networking, comprising:
receiving information from each of one or more drones, the information comprising a type of coverage, a type and amount of throughput, a location, and battery data, wherein a drone provides a service; and
responsive to the information and one or more service requests, executing a positioning algorithm that positions the one or more drones into an extensible mesh network by attempting to balance an optimal coverage area associated with the one or more drones, an optimal power utilization for each of the drones, and a desired quality-of-service associated with the one or more service requests;
wherein the extensible mesh network provides network coverage to an area that is not serviced by a terrestrial wired network.

9. The method as described in claim 1 wherein service requests originate from user equipment (UE).

10. The method as described in claim 1 further including reconfiguring the extensible mesh network dynamically upon a given occurrence.

11. The apparatus as described in claim 10 wherein first and second drones in the extensible mesh network execute distinct compute functions as a function of available power.

12. A method of networking, comprising:
receiving information from each of one or more drones, the information comprising a type of coverage, a type and amount of throughput, a location, and battery data, wherein a drone provides a service;
responsive to the information and one or more service requests, executing a positioning algorithm that positions the one or more drones into an extensible mesh network by attempting to balance an optimal coverage area associated with the one or more drones, an optimal power utilization for each of the drones, and a desired quality-of-service associated with the one or more service requests; and reconfiguring the extensible mesh network dynamically upon a given occurrence;

wherein the extensible mesh network is reconfigured by rotating one or more drones in and out of the extensible mesh network.

13. A method of networking, comprising:

receiving information from each of one or more drones, the information comprising a type of coverage, a type and amount of throughput, a location, and battery data, wherein a drone provides a service; and responsive to the information and one or more service requests, executing a positioning algorithm that positions the one or more drones into an extensible mesh network by attempting to balance an optimal coverage area associated with the one or more drones, an optimal power utilization for each of the drones, and a desired quality-of-service associated with the one or more service requests;

wherein first and second drones in the extensible mesh network execute distinct compute functions as a function of available power.

14. Apparatus, comprising:

a processor;

computer memory holding computer program instructions executed by the processor, the computer program instructions including program code configured to:

receive information from each of one or more drones, the information comprising a type of coverage, a type and amount of throughput, a location, and battery data, wherein a drone provides a service; and responsive to the information and one or more service requests, execute a positioning algorithm that positions the one or more drones into an extensible mesh network by attempting to balance an optimal coverage area associated with the one or more drones, an optimal power utilization for each of the drones, and a desired quality-of-service associated with the one or more service requests;

wherein the extensible mesh network provides network coverage to an area that is not serviced by a terrestrial wired network.

15. The apparatus as described in claim 14 wherein the terrestrial wired network is an Internet Protocol (IP)-based network.

16. The apparatus as described in claim 14 wherein the positioning algorithm is a maximum flow algorithm.

17. The apparatus as described in claim 16 wherein the maximum flow algorithm is a Ford-Fulkerson algorithm.

18. The apparatus as described in claim 14 wherein the service is content delivery or application acceleration.

19. The apparatus as described in claim 14 wherein the extensible mesh network is created on-the-fly in response to a given occurrence.

* * * * *